United States Patent [19]

Lim et al.

[11] Patent Number: 5,754,416

[45] Date of Patent: May 19, 1998

[54] SINGLE SOFT SWITCHING CIRCUIT FOR POWER SUPPLY

[75] Inventors: Sung Ho Lim, Sungman; Deog Ho Lee, Suwon, both of Rep. of Korea

[73] Assignee: Samsung Electro-Mechanics Co., Ltd., Suwon, Rep. of Korea

[21] Appl. No.: 691,941

[22] Filed: Aug. 5, 1996

[30] Foreign Application Priority Data

Oct. 31, 1995 [KR] Rep. of Korea ............... 1995-38554
Oct. 31, 1995 [KR] Rep. of Korea ............... 1995-38555

[51] Int. Cl.$^6$ .................................................. H02M 3/335
[52] U.S. Cl. ........................... 363/49; 363/21; 363/131
[58] Field of Search ................................. 363/20, 21, 49, 363/91, 97, 127, 131

[56] References Cited

U.S. PATENT DOCUMENTS

| 5,126,931 | 6/1992 | Jitaru | 363/21 |
| 5,278,746 | 1/1994 | Matsumoto | 363/21 |
| 5,354,972 | 10/1994 | Han | 219/715 |
| 5,357,175 | 10/1994 | Kamada et al. | 315/411 |
| 5,418,704 | 5/1995 | Hua et al. | 363/21 |
| 5,486,752 | 1/1996 | Hua et al. | 323/222 |
| 5,571,439 | 11/1996 | Daley et al. | 219/716 |

*Primary Examiner*—Adolf Berhane
*Attorney, Agent, or Firm*—Ladas & Parry

[57] ABSTRACT

A single switching circuit for a power supply which can improve the efficiency of the power supply and reduce a manufacturing cost thereof. The single switching circuit includes a diode and a capacitor connected in series between both terminals of a main switching element, and a coil connected in parallel to the diode, and determines a duty cycle of a transformer coupled to the switching element.

3 Claims, 4 Drawing Sheets

FIG. 1
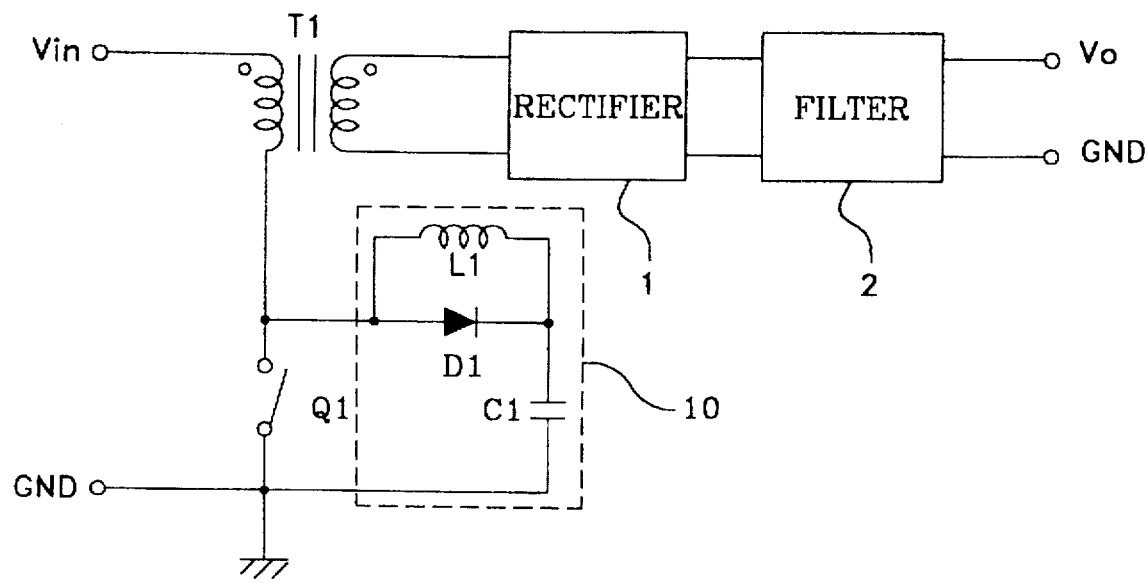
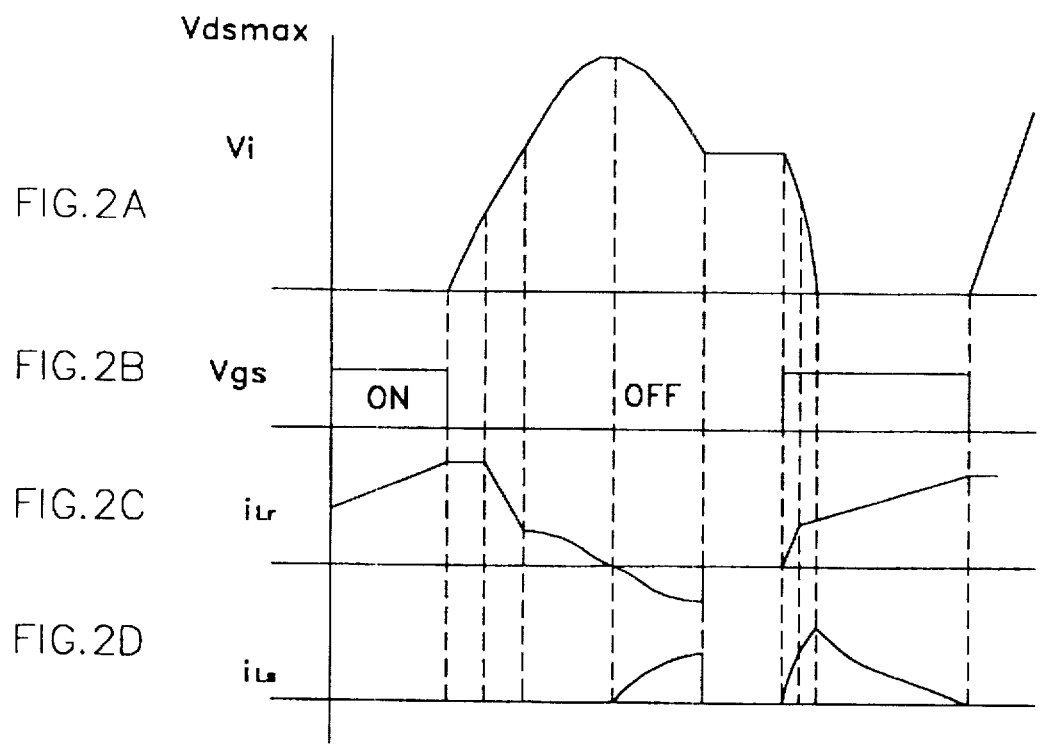
FIG. 2A
FIG. 2B
FIG. 2C
FIG. 2D

FIG.3
PRIOR ART
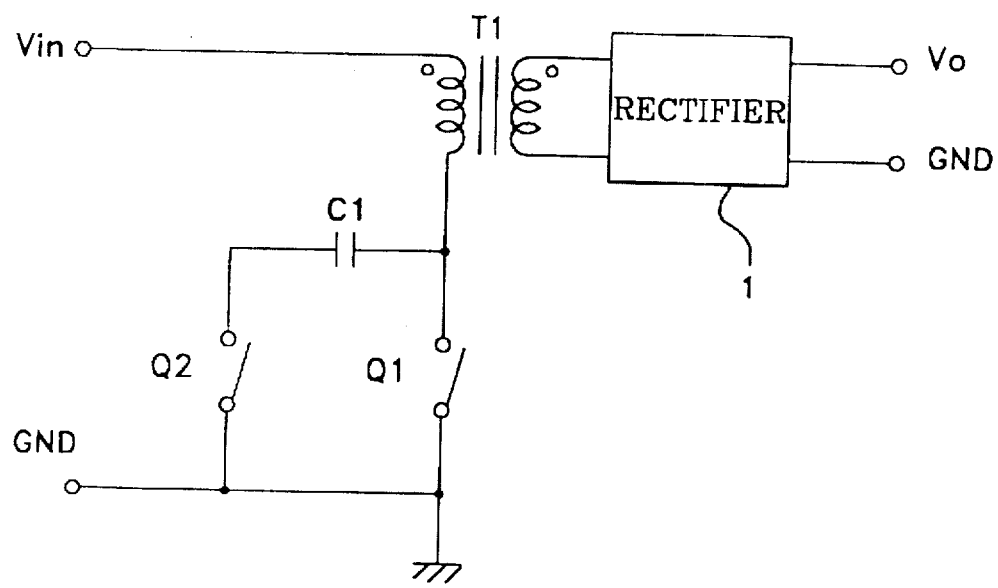
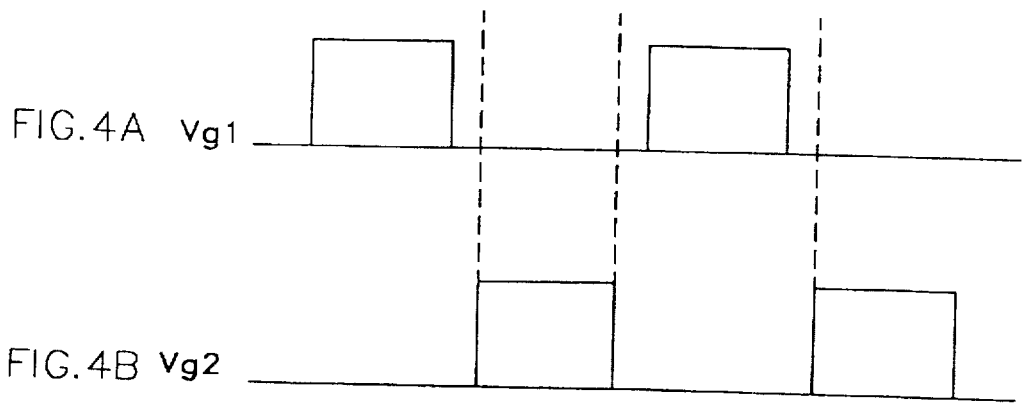
FIG.4A  Vg1
FIG.4B  Vg2

FIG.5
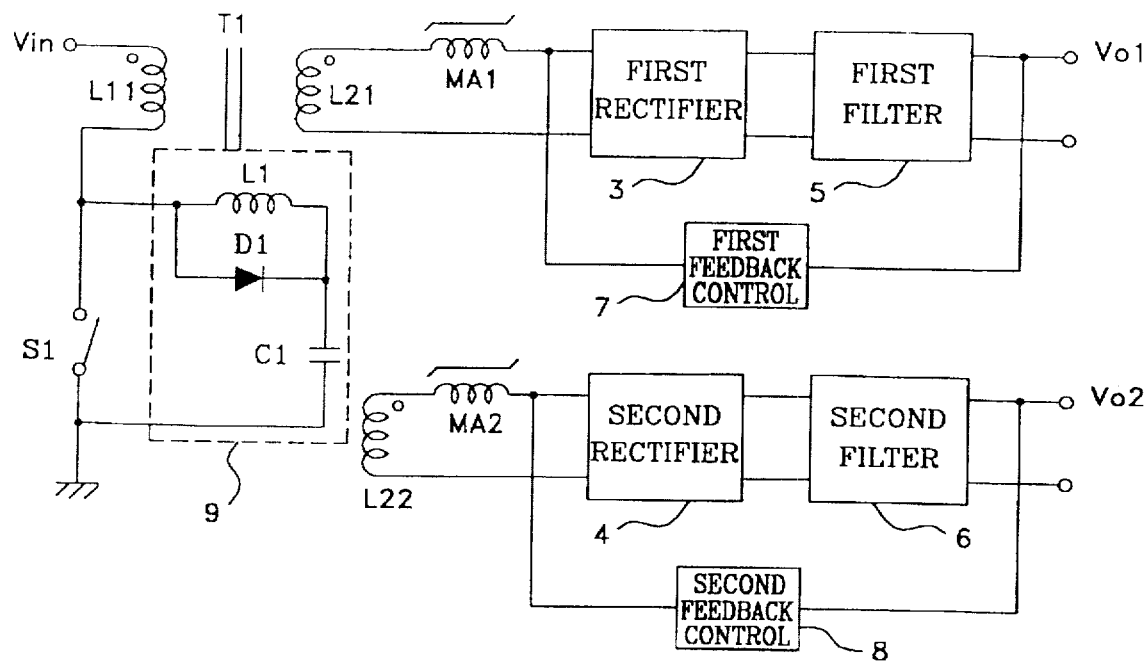
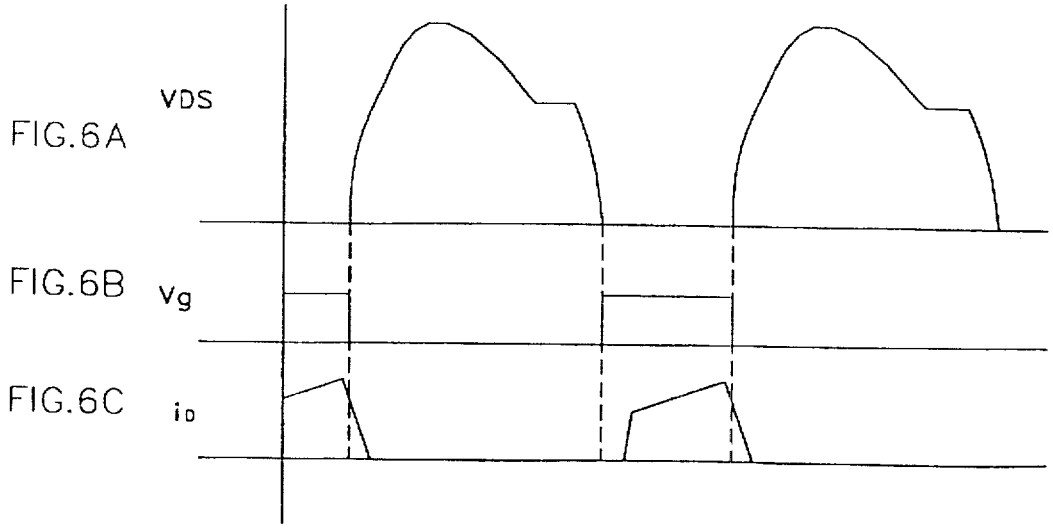
FIG.6A  $V_{DS}$
FIG.6B  $V_g$
FIG.6C  $i_D$ 5,754,416

1

SINGLE SOFT SWITCHING CIRCUIT FOR POWER SUPPLY

BACKGROUND OF THE INVENTION

1. Field of the Invention

The present invention relates to a single soft switching circuit for a power supply, and more particularly to a single soft switching circuit of for a power supply which can improve the efficiency of the power supply by adding a coil, a capacitor, and a diode to a switching element, and satisfy a cross regulation with the reduction of the switching loss by providing single soft switching to a main switching element and coupling magnetic amplifiers for post-regulation to a transformer, respectively.

2. Description of the Prior Art

A conventional switching circuit for a power supply, as shown in FIG. 3, comprises a main switching element Q1 connected in series between a primary winding of a transformer T1, to which an AC signal is inputted, and a ground terminal GND, a capacitor C1 and an auxiliary switching element Q2 connected to the main switching element Q1 in parallel, and a rectifier 1, coupled to a secondary winding of the transformer T1, for rectifying the AC voltage to a DC voltage.

According to the conventional switching circuit for a power supply as constructed above, the voltages as shown in FIGS. 4A and 4B are applied to gates of two switching elements Q1 and Q2 (for example, field effect transistors (FETs)), respectively, and the capacitor C1 is charged when the main switching element Q1 is turned on and the auxiliary switching element Q2 is turned off.

During this operation, the voltage stress of the main switching element (FET) Q1 is reduced since the charging operation of the capacitor C1 continues until the drain-source voltage VDS of the main switching element Q1 reaches the same voltage as the input supply voltage Vin.

Meanwhile, if the main switching element Q1 is turned on and the auxiliary switching element Q2 is turned off, the charges stored in the capacitor are gradually discharged, causing the 'on'-state current of the main switching element Q1 to increase smoothly, reducing the cross loss.

However, the conventional switching circuit has drawbacks in that its circuitry is completed to employ the two switching elements, and this causes the size and the manufacturing cost thereof to be increased.

FIG. 7 is a circuit diagram illustrating a conventional multi-output power supply. As shown in FIG. 7, the conventional multi-output power supply is provided with a transformer T1 having a primary winding L11 and two secondary windings L21 and L22, a main switching element S1 coupled to the primary winding L11 of the transformer T1, first and second rectifiers 31 and 32 for rectifying AC voltages developed in the secondary windings L21 and L22 to DC voltages of predetermined levels, respectively, first and second output filters 33 and 34 for removing noise signals contained in the DC voltages outputted from the rectifiers 31 and 32, respectively, and first and second feedback control sections 35 and 36 for detecting two multi-output voltages Vo1 and Vo2 outputted through the first and second output filters 33 and 34, and feeding the detected voltages back to input terminals of the first and second rectifiers 31 and 32.

According to the conventional multi-output power supply circuit as constructed above, the respective output voltages Vo1 and Vo2 can be sensed by the feedback control sections

2

35 and 36 coupled in parallel between the multi-output terminals and the input terminals of the first and second rectifiers 31 and 32, respectively, but such feedback control sections should be coupled to the high power output terminals to sense the output voltages.

However, the conventional multi-output power supply has problems in that if its output terminals are coupled to a light load and a maximum load, respectively, the cross regulation as well as its efficiency greatly deteriorates.

SUMMARY OF THE INVENTION

It is an object of the present invention to solve the problems involved in the prior art, and to provide a single soft switching circuit for a power supply which can improve its efficiency and reduce its manufacturing cost by employing a coil, capacitor, and diode set to a switching element.

It is another object of the present invention to provide a single soft switching circuit for a power supply which can reduce a switching loss and satisfy a cross regulation by providing single soft switching to a main switching element and coupling a magnetic amplifier for post-regulation to a secondary winding of a transformer.

In order to achieve above object, the present invention provides a single soft switching circuit for a power of supply comprising:

a switching element coupled to a primary winding of a transformer;

a rectifier for rectifying an AC voltage developed in a secondary winding of said transformer to a DC voltage;

a filter 2 for removing a noise signal contained in an output voltage of said rectifier; and a buffer circuit, coupled to said switching transistor, for buffering an on/off operation of said switching transistor to determine a duty cycle of said transformer.

BRIEF DESCRIPTION OF THE DRAWINGS

The above objects, other features, and advantages of the present invention will become more apparent through the following description of the preferred embodiments thereof with reference to the accompanying drawings in which:

FIG. 1 is a circuit diagram of the single soft switching circuit for a power supply according to an embodiment of the present invention.

FIGS. 2A to 2D are waveform diagrams explaining the operation of the single soft switching circuit according to the present invention.

FIG. 3 is a circuit diagram of a conventional power supply circuit.

FIGS. 4A and 4B are waveform diagrams illustrating gate voltages of the switching elements employed in the conventional switching circuit.

FIG. 5 is a circuit diagram of a single soft switching circuit for a multi-output power supply according to another embodiment of the present invention.

FIGS. 6A to 6C are waveform diagrams explaining the operation of the single soft switching circuit according to the present invention.

DETAILED DESCRIPTION OF THE PREFERRED EMBODIMENTS

Figure 7:
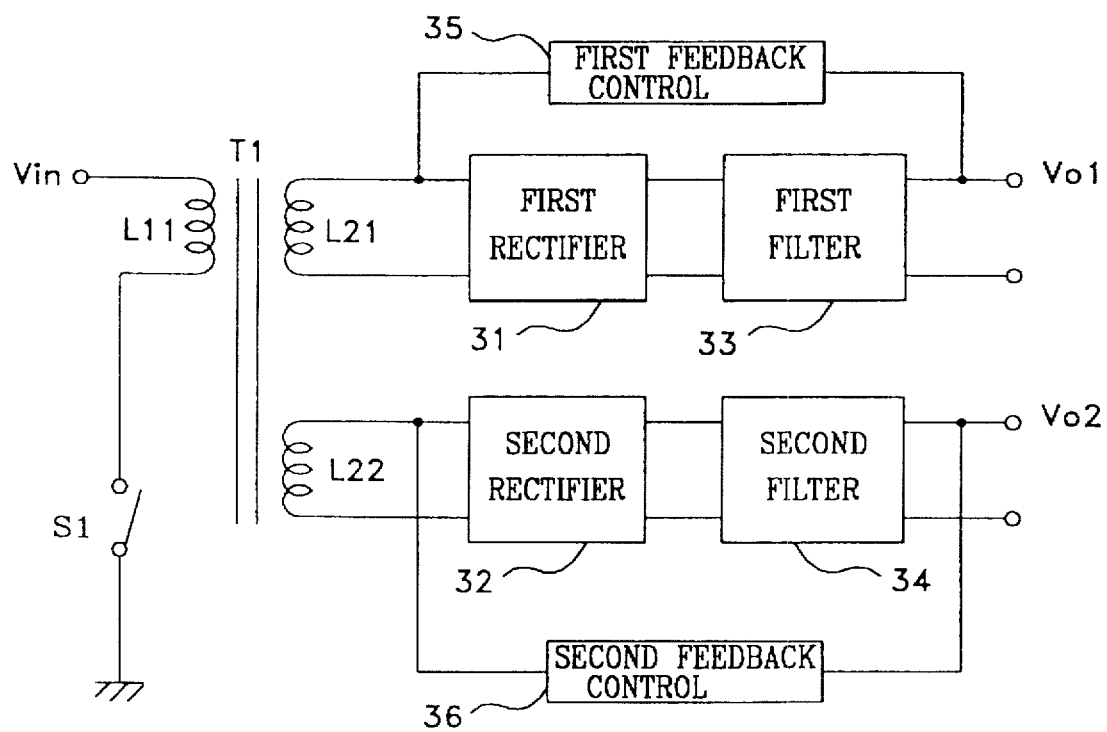
FIG. 7 is a circuit diagram of a conventional multi-output power supply.

FIG. 1 is a circuit diagram of the single soft switching circuit for a power supply. As shown in FIG. 1, the single soft switching circuit for a power supply according to the present invention is provided with a main switching element Q1 connected in series between a primary winding of a transformer T1, to which an AC signal is inputted, and a ground terminal GND, a rectifier 1 for rectifying an AC voltage developed in the secondary winding of; the transformer T1, a filter 2 for removing a noise signal contained in an output voltage of the rectifier 1, and a buffer circuit section 10, connected in parallel to the switching element, for buffering an on/off operation of the switching element Q1.

The buffer circuit section 10 comprises a diode D1 for rectifying the input AC voltage, a capacitor C1 in which a half-wave rectified voltage is charged, and a coil L1 for resonating until the charged voltage reaches a maximum value.

The operation of the present invention as constructed above will now be explained with reference to FIGS. 2A to 2D.

If the main switching element Q1 is turned off, the current iLr as shown in FIG. 2C flows through the primary winding of the transformer T1, and transfers to the source of the switching element Q1 via the capacitor C1, causing the capacitor C1 to be charged as high as the input voltage Vin as shown in FIG. 2A. As the capacitor C1 is charged, the coil L1 and the capacitor C1 resonate until the drain-source voltage of the main switching element (FET) Q1 reaches the maximum value.

Thereafter, the voltage charged in the capacitor C1 is discharged to be the level of the input voltage Vin, effecting resonance with the coil L1.

Meanwhile, FIG. 5 is a circuit diagram of a single soft switching circuit for a multi-output power supply according to another embodiment the present invention. As shown in FIG. 5, the single soft switching circuit for a multi-output power supply according to the present invention is provided with a transformer T1 having a primary winding L11 and two secondary windings L21 and L22; a main switching element S1 coupled to the primary winding L11 of the transformer T1; first and second rectifiers 3 and 4 for rectifying AC voltages developed in the secondary windings L21 and L22 of said transformer T1 to DC voltages of predetermined levels, respectively; first and second output filters 5 and 6 for removing noise signals contained in the DC voltages outputted from the first and second rectifiers 3 and 4, respectively; first and second feedback control sections 7 and 8 for detecting two multi-output voltages Vo1 and Vo2 outputted through the first and second output filters 5 and 6, and feeding the detected voltages back to input terminals of the first and second rectifiers 3 and 4; a soft switching section 9 fixing a duty cycle of the transformer T1; and magnetic amplifiers for post-regulation MA1 and MA2 connected between the secondary windings L21 and L22 of the transformer T1 and the input terminals of the first and second rectifiers 3 and 4.

The soft switching section 9 is composed of a coil L1 a diode D1, and a capacitor C1 for setting the duty cycle of the transformer T1.

The operation of the present invention as constructed above will now be explained with reference to FIGS. 5 and 6.

First, the duty cycle of the transformer T1 is set to a predetermined value by coupling the soft switching section 9 composed of the coil L1, the diode D1, and the capacitor C1, between both terminals of the main switching element S1 which is controlled by a pulse width modulator (not illustrated).

A feedback control is effected in the secondary winding of the transformer T1 by coupling the magnetic amplifiers for post-regulation MA1 and MA2 between the secondary windings L21 and L22 of the transformer T1 and the input terminals of the first and second rectifiers 3 and 4, respectively, which rectify AC voltages developed in the secondary windings L21 and L22 of the transformer T1 to DC voltages.

Specifically, when the semiconductor main switching element S1 is turned on, causing the drain-source voltage thereof to be the one as shown in FIG. 2A, the capacitor C1 in the soft switching section 9 and the magnetic amplifier MA1 for post-regulation produce resonance, and thus the turned-on current 1D of the diode is delayed as shown in FIG. 2C, causing the 'on'-stated switching loss to be prevented from generation, and the feedback operation from the output terminals Vo1 and Vo2 to the input terminals of the first and second rectifiers 3 and 4 are separately performed by the first and second feedback control sections 7 and 8, respectively. Thus, the cross regulation can be perfectly achieved.

The voltage waveform Vg being applied to the gate of the main switching element S1 is shown in FIG. 2B.

From the foregoing, it will be apparent that the present invention has advantages in that it can improve the efficiency of the power supply and reduce the manufacturing cost of products by providing single soft switching to the switching element. Also, it can reduce the switching loss and satisfy the cross regulation by coupling magnetic amplifiers for post-regulation to the secondary winding of the transformer.

While the present invention has been described and illustrated herein with reference to the preferred embodiments thereof, it will be understood by those skilled in the art that various changes in form and details may be made therein without departing from the spirit and scope of the invention.

What is claimed is:

1. A single soft switching circuit for a single output power supply comprising:
 a switching element connected in series between an input terminal of a primary winding of a transformer and ground;
 a rectifier for rectifying an AC voltage developed in a secondary winding of said transformer to produce a DC output voltage;
 a filter for removing noise contained in the output voltage of said rectifier; and
 a buffer circuit connected in parallel with said switching element, for buffering an on/off operation of said switching element to determine a duty cycle of said transformer, said buffer circuit comprising:
  a diode connected between said input terminal of said primary winding and said switching element for half-wave-rectifying an input AC supply voltage;
  a capacitor connected in series with said diode and in which a half wave rectified voltage is charged; and
  a coil for resonating until said charged voltage reaches a predetermined maximum value,
  said diode and said capacitor being connected in series between both terminals of said switching element, and said coil being connected in parallel with said diode.

2. A single soft switching circuit for a multi-output power supply comprising:
 a transformer having a primary winding and two secondary windings;

a main switching element connected in series between an input terminal of said primary winding of said transformer and ground;

first and second rectifiers for rectifying AC voltages developed in said secondary windings of said transformer to produce DC voltages of predetermined levels, respectively;

first and second output filters for removing noise signals contained in said DC voltages outputted from said first and second rectifiers, respectively;

first and second feedback control means for detecting output voltages of said multi-output power supply outputted through said first and second output filters, and feeding said detected voltages back to input terminals of said first and second rectifiers; and a soft switching means connected in parallel with said switching element for determining a duty cycle of said transformer, said soft switching means comprising a diode connected between said input terminal of said primary winding of said transformer and said switching element for half-wave rectifying an input AC supply voltage, a capacitor connected in series with said diode for being charged by the rectified voltage from said diode, and a coil for resonating until the charged voltage in the capacitor reaches a predetermined maximum value, said diode and said capacitor being connected in series between both terminals of said switching element and said coil being connected in parallel with said diode.

3. A single soft switching circuit for a multi-output power supply as claimed in claim 2, further comprising magnetic amplifiers for post-regulation connected between said secondary windings of said transformer and input terminals of said first and second rectifiers.

* * * * *